US011413828B2

(12) United States Patent
Le Meur et al.

(10) Patent No.: US 11,413,828 B2
(45) Date of Patent: Aug. 16, 2022

(54) AIRCRAFT BLADE AND METHODS OF FORMING AND REPAIRING AN AIRCRAFT BLADE

(71) Applicant: Ratier-Figeac SAS, Figeac (FR)

(72) Inventors: Kévin Le Meur, Figeac (FR); Patrice Brion, Lunan (FR); Ludovic Prunet, Themines (FR); Fabien Ramirez, Tauriac (FR)

(73) Assignee: RATIER-FIGEAC SAS, Figeac (FR)

( * ) Notice: Subject to any disclaimer, the term of this patent is extended or adjusted under 35 U.S.C. 154(b) by 779 days.

(21) Appl. No.: 15/984,740

(22) Filed: May 21, 2018

(65) Prior Publication Data

US 2018/0333922 A1 Nov. 22, 2018

(30) Foreign Application Priority Data

May 22, 2017 (EP) ..................................... 17305595

(51) Int. Cl.
*B29C 65/00* (2006.01)
*B64F 5/10* (2017.01)
(Continued)

(52) U.S. Cl.
CPC ........ *B29C 66/73116* (2013.01); *B29C 65/02* (2013.01); *B29C 65/4815* (2013.01);
(Continued)

(58) Field of Classification Search
CPC ............. B29C 66/73116; B29C 66/543; B29C 65/4815; F01D 5/282; F01D 5/147
See application file for complete search history.

(56) References Cited

U.S. PATENT DOCUMENTS 3,586,460 A 6/1971 Toner
5,129,787 A 7/1992 Violette et al.
(Continued)

FOREIGN PATENT DOCUMENTS

EP 0495655 A1 7/1992
EP 2290194 A2 8/2010
(Continued)

OTHER PUBLICATIONS

David Roylance, "Introduction to Fracture Mechanics", Department of Materials Science and Engineering, Massachusetts Institute of Technology, Jun. 14, 2001, 18 pages.
(Continued)

*Primary Examiner* — Daniel McNally
(74) *Attorney, Agent, or Firm* — Cantor Colburn LLP (57) ABSTRACT

A method of making an aircraft blade is provided. The method comprises the steps of: assembling two or more fibre-reinforced thermoplastic composite parts into a blade assembly; and welding the fibre-reinforced thermoplastic composite parts together utilising an additional thermoplastic located at least at locations where the parts will abut when assembled. The additional thermoplastic has a melting or softening temperature lower than a melting temperature of each of the fibre-reinforced thermoplastic composite parts being assembled. The step of welding comprises heating the blade assembly to a temperature above the melting/softening temperature of the additional thermoplastic and below the melting temperature of each of the fibre-reinforced thermoplastic composite parts so as to melt/soften the additional thermoplastic and thereby weld the fibre-reinforced thermoplastic composite parts together to form the aircraft blade.

7 Claims, 4 Drawing Sheets

(51) Int. Cl.
  *B64F 5/40* (2017.01)
  *B64C 11/26* (2006.01)
  *B29C 73/04* (2006.01)
  *B29C 65/02* (2006.01)
  *B29C 65/48* (2006.01)
  *F01D 5/28* (2006.01)
  *F01D 5/00* (2006.01)
  *F01D 5/14* (2006.01)
  *B29D 99/00* (2010.01)
  *B29L 31/08* (2006.01)
  *B29C 65/16* (2006.01)
  *B29C 65/08* (2006.01)
  *B29C 65/06* (2006.01)
  *B64C 27/473* (2006.01)

(52) U.S. Cl.
  CPC ......... *B29C 66/112* (2013.01); *B29C 66/114* (2013.01); *B29C 66/1142* (2013.01); *B29C 66/543* (2013.01); *B29C 66/721* (2013.01); *B29C 66/73115* (2013.01); *B29C 66/73921* (2013.01); *B29C 73/04* (2013.01); *B29D 99/0028* (2013.01); *B64C 11/26* (2013.01); *B64F 5/10* (2017.01); *B64F 5/40* (2017.01); *F01D 5/005* (2013.01); *F01D 5/147* (2013.01); *F01D 5/282* (2013.01); *B29C 65/06* (2013.01); *B29C 65/08* (2013.01); *B29C 65/16* (2013.01); *B29C 66/71* (2013.01); *B29C 66/7212* (2013.01); *B29L 2031/08* (2013.01); *B29L 2031/082* (2013.01); *B64C 2027/4736* (2013.01); *F05D 2230/60* (2013.01); *F05D 2230/80* (2013.01); *F05D 2300/603* (2013.01)

(56) References Cited

U.S. PATENT DOCUMENTS

| | | |
|---|---|---|
| 5,199,141 A | 4/1993 | Trask et al. |
| 5,389,184 A | 2/1995 | Jacaruso et al. |
| 5,454,693 A | 10/1995 | Aubry et al. |
| 5,462,408 A | 10/1995 | Coffy |
| 5,793,024 A | 8/1998 | Matsen et al. |
| 6,749,704 B2 | 6/2004 | Boussu et al. |
| 7,497,917 B2 | 3/2009 | Chen et al. |
| 8,129,011 B2 | 3/2012 | Laue et al. |
| 8,506,258 B2 | 8/2013 | Baker et al. |
| 8,715,556 B2 | 5/2014 | Murakami et al. |
| 2013/0280084 A1 | 10/2013 | Nagle et al. |
| 2014/0079903 A1* | 3/2014 | Hugon ................. B29C 66/634 428/105 |
| 2014/0294594 A1* | 10/2014 | Spoonire ............... F04D 29/023 416/230 |
| 2015/0165746 A1* | 6/2015 | Prebil .................... B32B 37/02 156/64 |
| 2016/0186774 A1 | 6/2016 | Manicke et al. |
| 2016/0250821 A1 | 9/2016 | Van Der Zijpp et al. |
| 2016/0377052 A1* | 12/2016 | Caruso ................. F03D 1/0675 416/226 |
| 2017/0028698 A1 | 2/2017 | Weiland et al. |
| 2017/0057158 A1 | 3/2017 | Caruso et al. |
| 2017/0058862 A1 | 3/2017 | Caruso et al. |
| 2017/0058865 A1 | 3/2017 | Caruso et al. |
| 2017/0074238 A1* | 3/2017 | Tobin .................... F03D 1/0675 |

FOREIGN PATENT DOCUMENTS

| | | |
|---|---|---|
| EP | 2270337 A1 | 1/2011 |
| EP | 2894025 A1 | 7/2015 |
| GB | 871625 A | 6/1961 |
| WO | 1996039326 A1 | 12/1996 |
| WO | 2008028224 A1 | 3/2008 |
| WO | 2014088704 A2 | 6/2014 |

OTHER PUBLICATIONS

Extended European Search Report for International Application No. 17305595.5 dated Nov. 7, 2017, 11 pages.

* cited by examiner

AIRCRAFT BLADE AND METHODS OF FORMING AND REPAIRING AN AIRCRAFT BLADE

FOREIGN PRIORITY

This application claims priority to European Patent Application No. 17305595.5 filed May 22, 2017, the entire contents of which is incorporated herein by reference.

TECHNICAL FIELD

The present disclosure relates to a method of making an aircraft blade and a method of repairing a damaged aircraft blade.

BACKGROUND

It is known to make lightweight fan blades or propeller blades for aircraft using fibre-reinforced composite (FRC) materials. These are materials that have a plurality of high-strength fibres embedded in a matrix that binds the fibres together and keeps them in fixed spatial relation to one another. Usually, the matrix is a resin or a thermoset or thermoplastic, but other materials may be used.

Various processes exist for making FRC articles such as the process described in US 2016/0186774. The process described in US 2016/0186774 is a slow process and is energy-intensive. It is also difficult to repair a damaged part of the blade without simply scrapping the whole blade. Thus, it is desirable to speed up manufacture of FRC blades and, as part of that aim, increase the reparability of such blades so that damage to the blade (sustained either during use or during manufacture) does not require discarding the entire blade and starting from scratch on a new blade.

SUMMARY

According to a first aspect, there is provided a method of making an aircraft blade, the method comprising the steps of: assembling two or more fibre-reinforced thermoplastic composite parts into a blade assembly; and welding the fibre-reinforced thermoplastic composite parts together utilising an additional thermoplastic located at least at locations where the parts will abut when assembled; wherein the step of welding comprises heating at least a portion of the blade assembly where the parts abut to a temperature which softens or melts the additional thermoplastic but is below the temperatures at which the thermoplastic of each of the composite parts melts, so as to weld the fibre-reinforced thermoplastic composite parts together by means of the softened or melted additional thermoplastic to form the aircraft blade.

Thus, the melting/softening temperature of the additional thermoplastic should be lower than the melting temperature of each of the fibre-reinforced thermoplastic composite parts. So, when the heating is carried out, the additional thermoplastic is melted/softened so as to weld the composite parts together, but the composite parts themselves do not melt.

The term "aircraft blade" is used herein to refer to any blade used by aircraft to control the flow of air for the purposes of propulsion. Thus, propeller blades and fan blades both fall under the general term "aircraft blade".

The composite parts may be made by any suitable process, such as thermostamping or thermoforming. Typically, in thermostamping, the composite is first heated by infrared and placed between the moulds of a press. The moulds have the same temperature during the process, below the melting point of the composite. The composite part is formed between the moulds and it cools down at the same time. Typically, in thermoforming, the composite is placed in the mould, either having been pre-heated by e.g. infrared, or, the mould itself is heated to the forming temperature. The heat to the mould is then turned off, and the temperature of the mould decreases from the forming temperature (above the melting point) to a temperature below the melting point (or softening point, as defined below). The composite part can then be removed.

Therefore, prior to the step of assembling, the method may further comprise forming the two or more fibre-reinforced thermoplastic composite parts by thermoforming or thermostamping.

Thermostamping a blade can be a very quick process. The time from closing the press around the parts of a blade to extracting the blade from the press may be around 2 minutes. The equivalent time for thermoforming a blade may be around 2 hours.

The individually made composite parts are welded together. This process utilises the additional thermoplastic located at least at locations where the parts will abut when assembled. This additional thermoplastic may be a coating on the composite parts which is provided during the manufacturing process of the composite parts. The entire part may have such a coating of additional thermoplastic, or, the additional thermoplastic coating may be provided only at the locations where the parts will abut when assembled. Or, instead of a coating provided during manufacture of the composite parts, the additional thermoplastic may be applied to the composite parts during assembly process. Generally, in this method, the additional thermoplastic will be applied only at those locations where the parts will abut when assembled.

At least a portion of the blade assembly is heated to a temperature which softens or melts the additional thermoplastic but is below the temperatures at which the thermoplastic of each of the composite parts melts. This temperature will therefore generally be between the melting temperature (or softening temperature, see below) of the additional thermoplastic and the melting temperature of each of the composite parts. Such heating may be achieved for example by ultrasonic heating, laser heating, friction heating or microwave heating. This melts or softens the additional thermoplastic and thereby welds the composite parts together to form the aircraft blade.

The assembling step may comprise laying the composite parts in a press which holds the parts in the assembled configuration. The press may then be heated in order to melt/soften the additional thermoplastic and weld the parts together. The heat is then removed from the press and it cools down to below the melting/softening temperature of the additional thermoplastic. The assembled blade is then removed from the press.

This manufacturing process also makes repair of the blade easier, as described in greater detail below.

By contrast, the process described in US 2016/0186774 involves forming a lay-up of multiple FRC layers, optionally stitching them together, and pressing the layers to bond them together. There is no additional thermoplastic which is melted or softened so as to join the layers together by welding. The pressed article is finished in an autoclave under high temperature and pressure. This produces a finished article that is essentially a single unit due to the method of bonding between the FRC layers. This means, for example, if the outer surface is damaged, it is not possible to remove a single damaged layer and replace it, which may require the whole blade to be scrapped. Further, the autoclaving process is energy and time-intensive.

The present method of using a plurality of pre-prepared fibre-reinforced thermoplastic composite parts may result in a significantly quicker process for forming and repairing blades.

Moreover, using an additional thermoplastic to join thermoplastic composite parts together can avoid the need for any chemical reaction during the process. Thus, the method is safer than methods involving steam or hazardous products.

In particular embodiments, the fibre-reinforced thermoplastic composite part may comprise polyether ether ketone (PEEK) or polyetherketoneketone (PEKK); and the additional thermoplastic may be polyetherimide (PEI) or polyaryletherketone (PAEK). However the skilled person will appreciate that other types of thermoplastics may also be used, providing that it is possible to heat at least a portion of the blade assembly to a temperature which softens/melts the thermoplastic but is below the temperatures at which the thermoplastic of each of the composite parts melts. In other words, the melting/softening temperature of the additional thermoplastic should be lower than the melting temperature of each of the fibre-reinforced thermoplastic composite parts. Note that, for the present application, "melting temperature" for a thermoplastic FRC refers solely to the melting temperature of the thermoplastic, and does not refer to any thermal property of the fibres of the FRC.

Amorphous polymers, such as PEI, do not have a defined melting point. That is, there is no sharp transition from solid behaviour to liquid behaviour, and there is no latent heat of fusion (i.e. there is no point at which heat energy is added to the polymer while temperature stays constant). Instead, at temperatures above the glass transition temperature ($T_g \approx 217°$ C. for PEI, for example) the polymer will gradually move from a rubbery state to a more liquid state. That is, as the temperature rises, the viscosity of the polymer will gradually drop and flow-like behaviour will increase when measured over a given timescale.

For each amorphous thermoplastic suitable for use according to the present disclosure, there will be a temperature range within which the polymer is in a sufficiently liquid state to act as a welding material. For example, PEI may have a temperature range of 320-355° C. within which PEI is sufficiently liquid to act as a welding material. This temperature range will vary for different thermoplastics. The bottom end of this temperature range is herein referred to as the "softening temperature", or, using the language of the claims, a "temperature which softens". Thus, the "softening temperature" (or "temperature which softens") may be defined as the minimum temperature at which the additional thermoplastic is soft enough that it is suitable for forming a weld joint.

Typically, it is desirable that the additional thermoplastic is in a thick, viscous liquid state when it forms the weld joint. In some situations, this may be considered as a state which is softened to an extent such that it is melted. However, the "softening" language is used in the claims since, as discussed above, amorphous thermoplastics do not, strictly speaking, have a melting temperature.

The skilled reader may easily perform a heating test on any given amorphous thermoplastic considered for use as a welding material in order to identify the suitable temperature range and the softening temperature at which the thermoplastic is suitable for forming the weld joint. This is well within the routine capacity of the skilled person.

PEEK and PEI mix well and form a good bond. Thus, in embodiments, the thermoplastic of the composite parts is PEEK and the additional thermoplastic is PEI.

Having all parts of the blade made from the same thermoplastic simplifies the choice of the additional thermoplastic. Thus, in embodiments, the thermoplastic composite parts to be assembled all comprise the same thermoplastic. This is in contrast to trying to bond together two dissimilar thermoplastics with a third thermoplastic (additional thermoplastic). It may be hard to find a third thermoplastic that bonds well to both of the two dissimilar thermoplastics.

As mentioned above, PEI may have a melting/softening range of 320-355° C., which is a range of temperatures at which the PEI is able to form a weld joint. Thus in the language of the present disclosure, the softening temperature may be 320° C., since this is the minimum temperature at which the PEI is sufficiently soft to form a weld joint.

PEEK may have a melting temperature of 343° C. and a FRC part may be formed (e.g. via thermoforming) using PEEK in a temperature range of 355–400° C. PEKK has a melting temperature of 337° C. and a FRC part may be formed (e.g. via thermoforming) using PEEK at a temperature of 380° C.

Thus, in one non-limiting example, two FRC items comprising PEEK may be joined together using PEI by heating the two pieces and the PEI to 320° C. to weld the pieces together.

The temperature range for thermoforming an FRC part may be called a process window. The process window may vary for different grades of a particular thermoplastic.

In embodiments, the fibres of the fibre-reinforced thermoplastic composites may be carbon fibres, glass fibres, aramid fibres, or a mixture thereof. These fibres have high axial strength and high Young's moduli and are generally suitable for high performance applications such as aerospace.

In embodiments, the blade may comprise at least two inserts and a stringer connected between the two inserts.

In embodiments, the method may further comprise, after the heating step, a step of overmoulding the blade.

The step of forming a plurality of separate fibre composite parts may comprise the steps of: constructing a fibre composite part from one or more high-strength fibre yarns and fibres of a thermoplastic; and heating the part above a melting temperature of the thermoplastic to melt the thermoplastic fibres to form the fibre composite part.

The step of constructing a fibre composite part may include weaving the one or more high-strength fibre yarns and fibres of a thermoplastic into a woven article. Thermoplastics are often highly viscous when melted and this can negatively affect an injection moulding process to construct a fibre composite. Weaving the high strength fibres with the thermoplastic in fibre-form, followed by a single heating step to melt the thermoplastic fibres around and between the high strength fibres may allow quicker and easier processing to form the fibre composite parts.

According to another aspect, there is provided a method of repairing a blade made according to any of the methods described above, wherein one of the plurality of fibre-reinforced thermoplastic composite parts of the aircraft blade is a damaged fibre-reinforced thermoplastic composite part; the method comprising the steps of: a first heating step comprising heating at least regions of the damaged fibre-reinforced thermoplastic composite part where it is joined to the rest of the blade; removing the damaged fibre-reinforced thermoplastic composite part; replacing the damaged part with an undamaged replacement fibre-reinforced thermoplastic composite part; assembling the parts into a repaired blade assembly; and a second heating step comprising heating at least regions of the replacement part where it abuts the rest of the blade to a temperature above the melting/softening temperature of the additional thermoplastic and below the melting temperature of each of the fibre-reinforced thermoplastic composite parts to melt the additional thermoplastic to weld the replacement part to the rest of the blade to form a repaired aircraft blade.

In a preferred method of repairing an aircraft blade, the first step of heating may comprise heating the entire blade to melt/soften all of the additional thermoplastic in the blade, and either the second heating step may comprise heating the entire repaired blade assembly to a temperature above the melting/softening temperature of the additional thermoplastic and below the melting temperature of each of the fibre-reinforced thermoplastic composite parts to melt/soften the additional thermoplastic to weld together all parts of the blade to form a repaired aircraft blade; or the second heating step may comprise locally heating parts of the repaired blade assembly to a temperature above the melting/softening temperature of the additional thermoplastic and below the melting temperature of each of the fibre-reinforced thermoplastic composite parts to melt/soften the additional thermoplastic to weld the parts together and form the repaired aircraft blade.

This preferred method allows the inspection of all parts after disassembling the blade by melting/softening all the second thermoplastic.

In an alternative preferred method of repairing an aircraft blade, the first heating step may comprise locally heating one part of the blade to melt/soften the additional thermoplastic locally such that only the damaged fibre-reinforced thermoplastic composite part may be removed, and the second heating step may comprise locally heating a part of the repaired blade assembly to a temperature above the melting/softening temperature of the additional thermoplastic and below the melting temperature of each of the fibre-reinforced thermoplastic composite parts to melt/soften the additional thermoplastic to weld the replacement fibre-reinforced thermoplastic composite part to the rest of the blade to form the repaired aircraft blade.

This preferred method allows solely the damaged part of the blade to be removed and replaced with an undamaged part without affecting those undamaged portions of the blade.

According to another aspect, there is provided an aircraft blade comprising: two or more fibre-reinforced thermoplastic composite parts; and an additional thermoplastic that joins the plurality of fibre-reinforced thermoplastic composite parts into the aircraft blade, wherein the additional thermoplastic has a melting/softening temperature below a melting temperature of each of the fibre-reinforced thermoplastic composite parts.

A blade made according to this aspect is easy to construct. Further, the use of an additional thermoplastic helps to avoid any thermal distortion of the parts made from the another thermoplastic. This allows simpler control during manufacture of the finished shape of the blade. It is also easy to repair this blade without scrapping the entire blade when a part is damaged.

The two or more fibre-reinforced thermoplastic composite parts may include two shells for forming an airfoil surface of the blade, at least one insert, a core, and optionally, a stringer for connecting between the at least two inserts. The inserts may connect the core to the shells. In this context, a "core" may also be known as a "spar".

Each of two or more fibre-reinforced thermoplastic composite parts may comprise the same thermoplastic. Or, two or more of the fibre-reinforced thermoplastic composite parts may comprise different thermoplastics, such as PEEK or PEKK. In embodiments, the additional thermoplastic is PEI or PAEK.

There is further provided a method of repairing a damaged aircraft blade by replacing a damaged part of the blade, wherein the aircraft blade comprises: two or more fibre-reinforced thermoplastic composite parts joined together; the blade further comprising an additional thermoplastic having a melting or softening temperature lower than the melting temperature of each of the two or more fibre-reinforced thermoplastic composite parts, wherein the additional thermoplastic joins each of the plurality of parts together into the aircraft blade; the method comprising the steps of: heating the damaged aircraft blade to a temperature above the melting or softening temperature of the additional thermoplastic and below the melting temperature of each of the two or more fibre-reinforced thermoplastic composite parts to melt or soften the additional thermoplastic to unjoin the plurality of fibre-reinforced thermoplastic composite parts; removing each of the plurality of fibre-reinforced thermoplastic composite parts that is damaged; replacing each damaged part with an undamaged fibre-reinforced thermoplastic composite part; assembling undamaged parts into a repaired blade assembly; and heating the repaired blade assembly to a temperature above the melting or softening temperature of the additional thermoplastic and below the melting temperature of each of the two or more fibre-reinforced thermoplastic composite parts to melt or soften the additional thermoplastic to weld the plurality of parts together to form a repaired aircraft blade; preferably before the step of assembling undamaged parts, the method further comprises the step of applying the additional thermoplastic to one or more locations where the parts will abut when assembled into a repaired blade assembly.

It will be readily appreciated by the skilled person that the various optional and preferred features of embodiments of the disclosure described above may be applicable to all the various aspects of the disclosure discussed.

DESCRIPTION OF THE FIGURES

Certain embodiments of the present disclosure will now be described in greater detail by way of example only and with reference to the accompanying drawings in which.

A plurality of parts to be assembled into a blade for an aircraft are shown, in particular

DETAILED DESCRIPTION

Figure 1A:
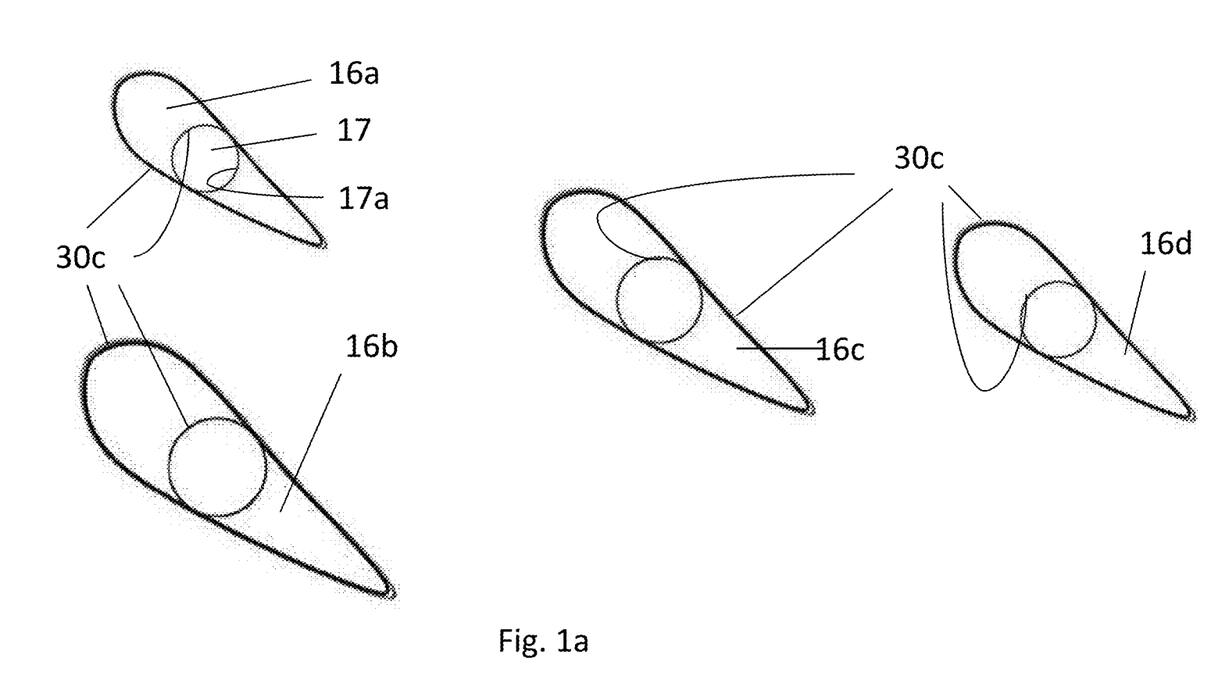
Figure 1a illustrates inserts.
Figure 1B:
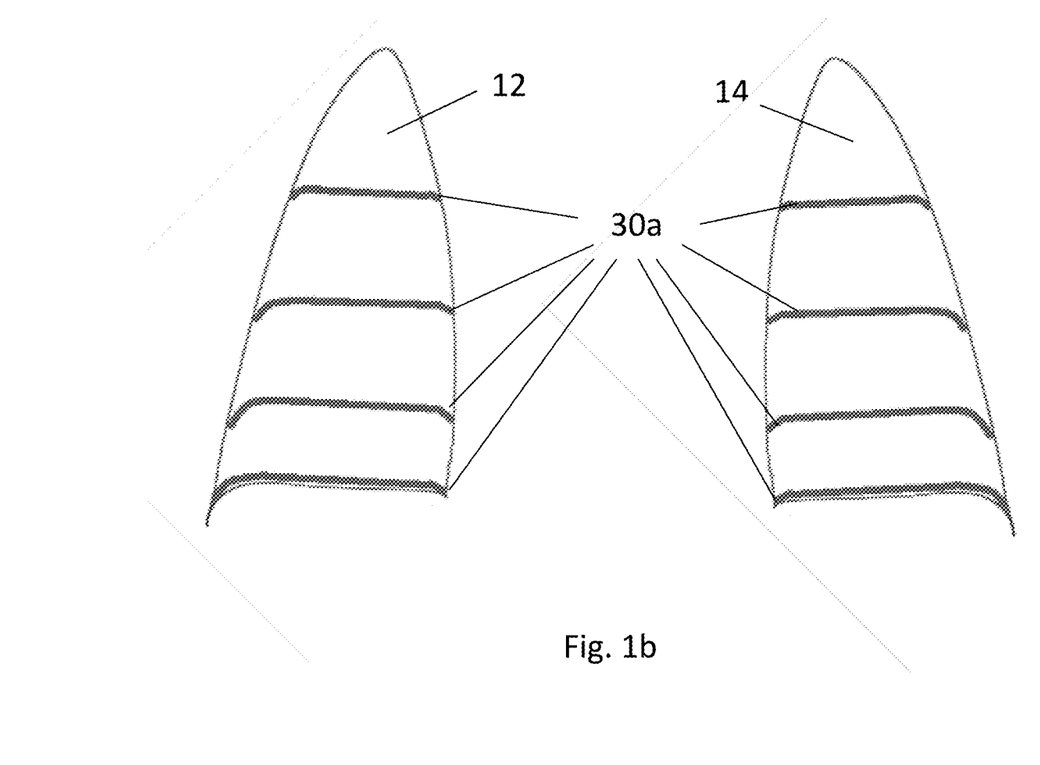
Figure 1b illustrates shells.
Figure 1C:
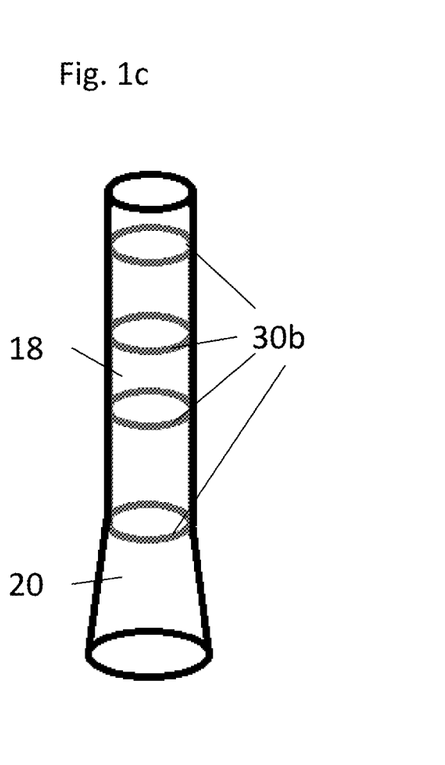
Figure 1c illustrates a core and Figure 1d illustrates an I-beam.
Figure 1D:
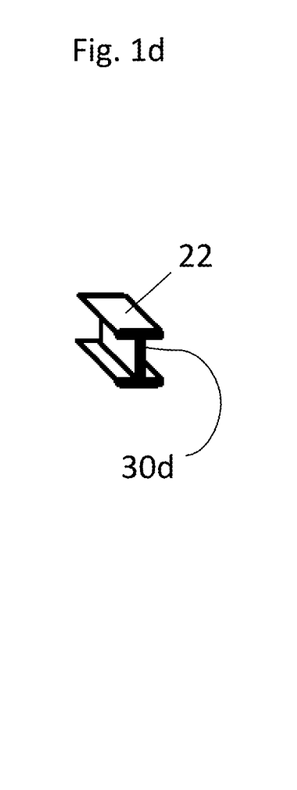

FIGS. 1a to 1d show a plurality of separate pre-formed parts used to construct an aircraft blade 10. In FIG. 1b there are shown two shells 12, 14 that, in the finished blade 10, form the airfoil surface of the blade. In FIG. 1c there is illustrated a core 18 that is provided with a connector 20 (e.g. a tulip) that allows for connection of the core 18 to a rotor hub or disc (not shown). As illustrated in FIG. 1a, one or more inserts 16a-d are provided. In the finished blade 10, these connect the core 18 to the blade 10. Each insert 16a-d has a central aperture 17 that is sized so as to fit snugly around the core 18 at the correct position along the core for that insert 16a-d. Of course, other shapes of inserts may be used. The one or more inserts 16a-d are used to connect the shells 12, 14 to the core 18 to form the blade 10. A stringer or an I-beam 22 may optionally be provided as illustrated in FIG. 1d.

Figure 2:
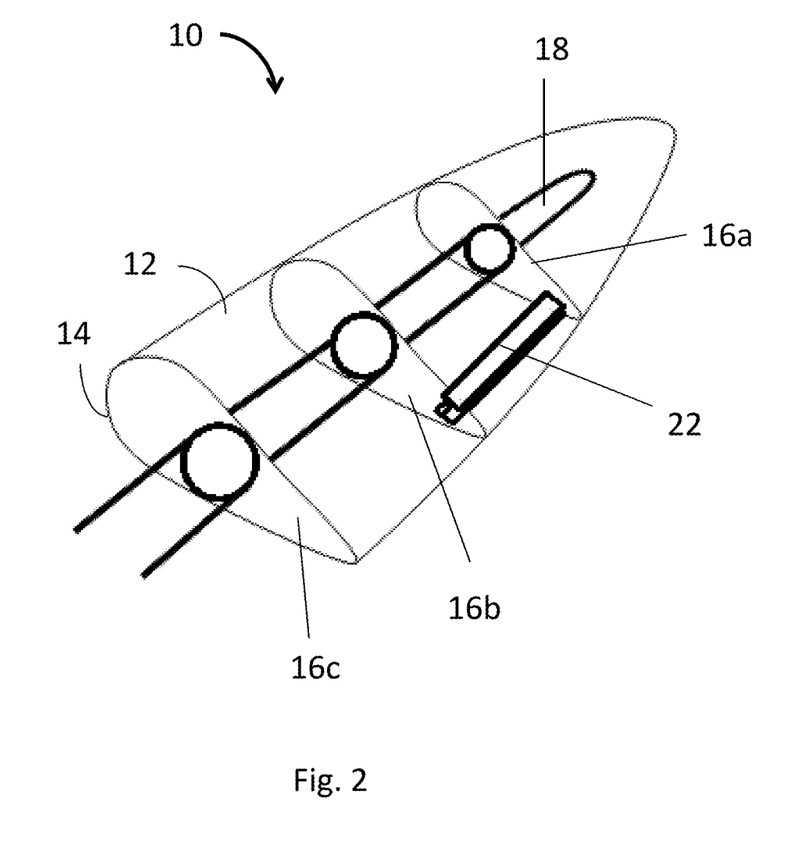
FIG. 2 shows a view of the assembled blade.

FIG. 2 shows the finished blade 10 with the internal parts (e.g. core 18, inserts 16a-c) visible through the shells 12, 14. The stringer or I-beam 22 may be included to connect two adjacent inserts, e.g. 16b and 16c, such that in the finished blade 10 these two inserts 16b, 16c are connected together by each of: the core 18, the I-beam 22, and the shells 12, 14. The stringer or I-beam 22 may thus provide reinforcement along at least a longitudinal axis of the blade 10.

The shells 12, 14, inserts 16a-d, the core 18, and any stringers or I-beams 22 are each be made from a fibre-reinforced thermoplastic composite. The thermoplastic used for each fibre-reinforced thermoplastic composite part may be a first thermoplastic having a first melting temperature. For example, the first thermoplastic may be PEEK or PEKK.

Alternatively, different thermoplastics may be used for the different parts 12, 14, 16a-d, 18, 22. For example, the shells 12, 14 may be made using one thermoplastic (e.g. PEEK) while one or more of the inserts 16a-d is made from another thermoplastic (e.g. PEKK) etc. Importantly, the one or several thermoplastics used for the parts must each have a higher melting temperature than the melting temperature or the softening temperature (for an amorphous thermoplastic) of an "additional thermoplastic" (in the language of the claims) used to join the parts together, as discussed in more detail below. For simplicity, the different parts 12, 14, 16a-d, 18, 22 will be referred to as being made from a first thermoplastic and the additional thermoplastic is the "second thermoplastic"; however, it is to be understood that the different parts may nonetheless each comprise a different thermoplastic (i.e. different "first thermoplastics").

The parts may be formed by any suitable process, e.g. thermoforming, thermostamping, pultruding, lay-up processes etc. In thermostamping, the composite is first heated by infrared and placed between the moulds of a press. The moulds have the same temperature during the process, below the melting point of the composite. The composite part is formed between the moulds and it cools down at the same time. In thermoforming, the composite is placed in the mould, either having been pre-heated by e.g. infrared, or, the mould itself is heated to the forming temperature. The heat to the mould is then turned off, and the temperature of the mould decreases from the forming temperature (above the melting/softening point) to a temperature below the melting/softening point. The composite part can then be removed.

In this described embodiment, after forming the composite parts, a second ("additional") thermoplastic is applied to various of the parts at various locations 30a-d where the parts will be joined to one another in the finished blade 10. The second thermoplastic is to perform the function of "gluing together" the disparate parts into a finished blade 10. Therefore, the second thermoplastic is selected to have a second melting temperature, or a softening temperature (for the case of an amorphous thermoplastic that does not have a defined "melting point"), that is lower than a first melting temperature of the first thermoplastic. Consequently, when the disparate parts are heated to a temperature between the first and second melting temperatures (or between the softening temperature and the first melting temperature), the second thermoplastic melts (or exhibits sufficiently liquid-like behavior) while the first thermoplastic stays solid. The process of joining the parts together is explained in greater detail below.

As one non-limiting example shown in FIG. 1b, the second thermoplastic may be applied to one or more regions 30a of the shells 12, 14. The second thermoplastic may be applied to one or more regions 30c of the inserts 16a-d (FIG. 1a). The second thermoplastic may be applied to one or more regions 30b of the core 18 (FIG. 1c). The second thermoplastic may be applied to one or more regions 30d of the I-beam 22 (FIG. 1d).

On the inserts 16a-d, the second thermoplastic may be applied to either, both or neither of the outer circumference of the insert (where it abuts the shells 12, 14, in the finished blade) or the circumference 17a of the central aperture 17 where the insert abuts the core 18 in the finished blade 10.

In some embodiments, the second thermoplastic is only applied to one side of a join, i.e. it is applied to one out of two parts that are to be joined together at a given join. As one non-limiting example, the second thermoplastic may be applied to one of the shells 12 at a region 30a, and not applied to the outside of the specific insert 16 that will join to that region of the shell 12. Alternatively, and sometimes more preferably, the second thermoplastic may be applied to both parts that are to be joined together at a given join before joining the parts together.

In a further embodiment described later, the additional (second) thermoplastic is coated on the outside of the part during manufacture of the part.

To form the finished blade 10, the plurality of separate fibre-reinforced parts 12, 14, 16, 18, 20, 22 may have the second thermoplastic applied to the selected regions as described above and then be placed together in a heated press.

The blade assembly is heated to a temperature above the melting temperature/softening temperature, as appropriate, of the additional (second) thermoplastic and below the melting temperature(s) of each of the composite parts, i.e. below the lowest melting temperature among the thermoplastic(s) used for the plurality of parts. Such heating may be achieved for example by ultrasonic heating, laser heating, heating wire, infrared radiation, microwave radiation, and/or friction heating. This melts/softens the additional thermoplastic and thereby welds the composite parts together to form the aircraft blade.

If the heat is directed to the particular regions where the parts are to be welded, this may have the advantage of only affecting a single joint at a time, which may make replacement of a single part, e.g. a damaged part, simpler without requiring deconstruction of other (undamaged) parts of the blade 10.

The assembling step may comprise laying the composite parts in a press which holds the parts in the assembled configuration. The press may then be heated in order to melt/soften the additional thermoplastic and weld the parts together. The heat is then removed from the press and it cools down to below the melting/softening temperature of the additional thermoplastic. The assembled blade is then removed from the press.

It may also be desirable to repair a FRC blade 10. A blade 10 constructed according to the above method may be repaired by removing one or more damaged parts 12, 14, 16a-d, 18 etc. and replacing the damaged part with an undamaged one and re-forming the blade. Having the second thermoplastic with a lower melting/softening temperature than the first thermoplastic allows the blade 10 as a whole to be deconstructed into individual FRC parts, or for individual parts of the blade 10 to be removed without affecting other parts.

In one embodiment, a method of repairing a blade includes heating specific regions of a given (damaged) part of the blade 10, so as to melt/soften the second thermoplastic that joins that part of the blade onto the rest of the blade 10. For example, to repair a damaged shell 12, the method includes heating the shell 12 at specific regions 30a so as to melt/soften the second thermoplastic that joins the shell 12 to other parts of the blade 10.

This may be done without melting/softening the second thermoplastic where it joins the insert(s) 16a-d to the core 18, and without melting/softening the second thermoplastic where it joins the inserts to the other shell 14. Thus, the first shell 12 may be removed from the blade 10 and replaced with a new shell 12 part. Again, local heating may be applied to regions 30a of the new shell 12 part so as to melt/soften the second thermoplastic and join the new shell 14 part to the remainder of the blade 10.

Alternatively, the whole blade 10, including the damaged part, may be heated to melt/soften all regions of the second thermoplastic and thus separate all constituent parts 12, 14, 16, 18, 20, 22 of the blade 10. The or each damaged part may then be replaced with a new (undamaged) part and the whole blade 10 may then be reconstructed by welding, in the manner described above for the initial construction of the blade. Enough second thermoplastic may still be present on the blade assembly where the replacement part is to be attached that the assembly is simply heated in order to weld the replacement part by means of this existing second thermoplastic. Or, where required, the second thermoplastic may be re-applied to regions 30a-d to be re-joined.

The finished blade 10 shown in FIG. 2 is also illustrative of a blade 10 that has been repaired by the above method. It will be appreciated that the above described method of making the blade is only one way of making the finished blade 10, and that alternative methods may be used to construct a blade according to the scope of the disclosure, such as a blade that comprises a plurality of fibre-reinforced thermoplastic composite parts, wherein the plurality includes: two fibre-reinforced thermoplastic composite shells 12, 14, forming an airfoil surface of the aircraft blade; one or more fibre-reinforced thermoplastic composite inserts 16a-d joined to the two shells 12, 14; a core 18 joined to the one or more fibre-reinforced thermoplastic composite inserts 16a-d; wherein each of the plurality of fibre-reinforced thermoplastic composite parts comprises a first thermoplastic having a first melting temperature that is above the melting/softening temperature of a second thermoplastic such, wherein the second thermoplastic joins the plurality of fibre-reinforced thermoplastic composite parts into the aircraft blade.

A blade 10 having the structure described above may be readily repaired by melting/softening the second thermoplastic (either locally or globally) to replace any damaged parts. This may be easier to perform on such a blade 10 than on another blade X entirely constructed of a single fibre-reinforced thermoplastic composite (i.e. with no second thermoplastic having a lower melting/softening temperature).

It is notoriously difficult to repair FRC parts by comparison with, say, metal parts. In some FRC the matrix is irreversibly solidified during construction (e.g. many polymerisation reactions are irreversible), and addition of material during repairs may not bond properly to the already-polymerized portions of the part.

In such a blade X, a damaged portion cannot be repaired by the above method, and damage to one portion may lead to scrapping the entire blade X. Thus, a blade 10 according to the above description may be advantageous over the prior art blade X in terms of reducing wastage, improved construction and repair speeds, as well using a simpler and lower cost construction techniques.

In some examples, the second (additional) thermoplastic may be applied during manufacture of the parts as an outermost layer (a coating) to each of the different parts 12, 14, 16a-d, 18, 22 after the parts have been made from their own (e.g. first) thermoplastic. During construction of a blade, or repair of a blade, having the second thermoplastic already covering the parts eliminates the need to apply the second thermoplastic to specific locations for the welding. That is, the second thermoplastic is already present at all locations where two parts may abut one another.

Alternatively, the second (additional) thermoplastic may be applied as an outermost layer to each of the different parts 12, 14, 16a-d, 18, 22 only on surfaces that will face other parts. For example, the additional thermoplastic may be applied to an entire face of a shell 12 that will face inwards towards the core 18 when the blade 10 is assembled, while the opposite outwardly facing face is not coated with the additional thermoplastic (as no part of this face is ever welded to another part).

As one non-limiting example, the process of forming separate FRC parts and joining them together may comprise the steps:

1) Thermoform a first part comprising PEEK with carbon fibres at a temperature of 400° C. with PEI on the surface of the part;

2) Thermoform a second part comprising PEEK with carbon fibres in the same way, with the PEI on the surface;

3) Place the parts together and heat the PEI and PEEK parts, using an ultrasonic welder, to a temperature of 335° C. for 10 seconds. This softens the PEI to such an extent that it welds the PEEK parts together; and 4) Allow the parts to cool to room temperature having been welded together.

The invention claimed is:

1. A method of making an aircraft blade, the method comprising the steps of:

assembling a plurality of fibre-reinforced thermoplastic composite parts into a blade assembly, wherein the plurality of fibre-reinforced thermoplastic composite parts include a core, at least two planar inserts, two shells, and a stringer or I-beam having a first end and a second end; and welding the fibre-reinforced thermoplastic composite parts together utilising an additional thermoplastic located at least at locations where the parts will abut when assembled;

wherein the step of welding comprises heating at least a portion of the blade assembly where the parts abut to a temperature which softens or melts the additional thermoplastic but is below the temperatures at which the thermoplastic of each of the composite parts melts, so as to weld the fibre-reinforced thermoplastic composite parts together by means of the softened or melted additional thermoplastic to form the aircraft blade, and wherein, in the blade assembly, the two shells form a blade of the aircraft blade, the at least two planar inserts are attached to the core, and the stringer or I-beam connects to a first of the at least two planar inserts at said first end and to a second of the at least two of the planar inserts at said second end.

2. The method according to claim 1, wherein the step of welding comprises one or more of friction heating, laser heating, microwave heating, and ultrasonic heating to locally heat portions of the blade assembly.

3. The method according to claim 1, wherein each of the plurality of fibre-reinforced thermoplastic composite parts comprise the same thermoplastic; or wherein the plurality of of the fibre-reinforced thermoplastic composite parts comprise different thermoplastics.

4. The method according to claim 1, wherein the fibre-reinforced thermoplastic composite parts comprise PEEK and/or PEKK; and wherein the additional thermoplastic is PEI or PAEK.

5. The method according to claim 1, wherein the fibre-reinforced thermoplastic composite parts are at least partially coated with the additional thermoplastic during manufacture of the composite parts; or wherein the additional thermoplastic is applied to the manufactured fibre-reinforced thermoplastic composite parts during assembly.

6. The method according to claim 1, wherein, prior to the step of assembling, the method further comprises forming the plurality of fibre-reinforced thermoplastic composite parts by thermoforming or thermostamping; and/or after the heating step, a step of overmoulding the blade.

7. The method according to claim 1, wherein fibres of the fibre-reinforced thermoplastic composites are carbon fibres, glass fibres, aramid fibres, or a mixture thereof.

* * * * *